US006629436B1

(12) United States Patent
Skeen et al.

(10) Patent No.: US 6,629,436 B1
(45) Date of Patent: Oct. 7, 2003

(54) APPARATUS FOR THERMAL TREATMENT OF GLASS AND METHOD AND THERMALLY TREATED GLASS THEREFROM

(75) Inventors: W. Jason Skeen, Export, PA (US); Rudolph A. Karlo, Creighton, PA (US); Steven M. Horcicak, Lower Burrell, PA (US); Mark M. Savka, Sewickley, PA (US); Lawrence S. Letzkus, Pittsburgh, PA (US); Irvin A. Wilson, Apollo, PA (US); Michael Zibert, Saxonburg, PA (US); DeWitt W. Lampman, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 304 days.

(21) Appl. No.: 09/706,466

(22) Filed: Nov. 3, 2000

(51) Int. Cl.⁷ .................................. C03B 23/027
(52) U.S. Cl. ........................ 65/107; 65/102; 65/103; 65/288; 65/289; 65/290; 65/291; 65/374.11; 65/374.12; 65/374.13
(58) Field of Search .................. 65/103, 107, 102, 65/288, 289, 290, 291, 374.11, 374.12, 374.13

(56) References Cited

U.S. PATENT DOCUMENTS

| | | | |
|---|---|---|---|
| 3,741,743 A | * 6/1973 | Seymour | |
| 3,880,636 A | 4/1975 | Tobin et al. | 65/107 |
| 3,976,462 A | * 8/1976 | Sutara | |
| 4,066,429 A | 1/1978 | Reese et al. | 65/107 |
| 4,382,811 A | * 5/1983 | Luscher et al. | |
| 4,687,501 A | 8/1987 | Reese | 65/103 |
| 4,804,397 A | 2/1989 | Stas et al. | 65/107 |
| 4,889,547 A | 12/1989 | Lecourt et al. | 65/107 |
| 5,066,320 A | 11/1991 | Lehto et al. | 65/106 |
| 5,069,703 A | 12/1991 | d'Iribarne et al. | 65/104 |
| 5,129,934 A | 7/1992 | Koss | 65/107 |
| 5,385,786 A | 1/1995 | Shetterly et al. | 428/432 |
| 5,536,581 A | 7/1996 | Shetterly et al. | 428/432 |
| 5,669,952 A | 9/1997 | Claassen et al. | 65/106 |
| 5,833,729 A | 11/1998 | Meunier et al. | 65/106 |
| 5,858,047 A | 1/1999 | Frank et al. | 65/104 |
| 5,938,810 A | * 8/1999 | De Vries, Jr. et al. | |
| 6,006,549 A | 12/1999 | Savka et al. | 65/290 |
| 6,015,619 A | 1/2000 | Schnabel et al. | 428/410 |
| 6,076,373 A | 6/2000 | Grodziski | 65/107 |

FOREIGN PATENT DOCUMENTS

EP   1 006 086   12/1999
GB   2 320 021   6/1998

* cited by examiner

*Primary Examiner*—Michael Colaianni
(74) *Attorney, Agent, or Firm*—Kenneth J. Stachel; Andrew C. Siminerio

(57) ABSTRACT

The present invention is directed to an apparatus for thermal treatment of glass and method and thermally treated glass therefrom. The apparatus is capable of supporting the glass during thermal treatment such as tempering, annealing, bending, and/or shaping which can include any cooling or quenching to remove heat or any combination of these. The apparatus is a support member like a ring or outline mold with a horizontal surface suitable for contacting the glass. The support member has at least a surface with or without a coating for contact with the glass of one or more metals having a thermal conductivity such that the glass heated for shaping cools at a rate not much slower than the cooling rate of unsupported sections of the glass. Suitable metals include those with a thermal conductivity of greater than around 16 BTU/(hour×feet×° F.). When a coating covers at least a portion of the support, the coating can give the support member more heat resistance and/or anti-corrosiveness and/ or abrasion resistance to improve durability. Also the support member can be the shaping rail of a windshield or backlite shaping iron.

20 Claims, 4 Drawing Sheets

APPARATUS FOR THERMAL TREATMENT OF GLASS AND METHOD AND THERMALLY TREATED GLASS THEREFROM

FIELD OF THE INVENTION

The present invention is directed to an apparatus and method useful in thermally treating glass sheets or panels for tempering, annealing and/or shaping of the glass which can include quenching to remove heat. The shaping of the glass can involve bending glass sheets, placing curves in glass sheets and otherwise changing the contour of glass sheets and panels, such as in bending float glass sheets. Also the invention is directed to the resultant thermally treated glass sheets.

TECHNICAL CONSIDERATIONS

Glass sheets, panes, panels or parts have been heated for tempering, for annealing and for shaping as in bending, or placing curves or contours in the glass in industry by use of various processes and accompanying apparatus. Conventional tempering and annealing processes involve heating the glass with subsequent cooling of the heated glass at particular rates while the glass is supported on support members such as rings or outline molds. Shaping processes for glass include gravity bending, press bending, roll bending and like processes. These are as opposed to any production of glass bottles through blowing. In these glass shaping methods the heated glass is at a temperature for non-breaking deformation so that the glass accepts a shape or curve or bend given through one or more supporting and/or contacting members acting as a mold.

For instance, in gravity bending, bending fixtures or irons carry the glass through a furnace or a lehr to support the glass sheet during heating and usually also during subsequent cooling. The fixture usually supports the underside or bottom surface of the glass sheet in such a manner to allow for its bending or sagging due to gravity. The outlying shaping rail of the fixture provides the support and also can have an upper surface with elevational contours corresponding to at least part of the final desired shape of the glass sheet. With bending irons the main area of the glass is usually untouched during the bending process since the support is along the marginal end of the one or more glass sheets. The heated glass at its heat softening temperature sags by gravity to adopt the desired configuration. Also, bending irons can have movable parts to assist in the shaping of the glass. The shaping rails themselves can be segmented and/or made to pivot from an open, rigid sheet supporting position to a closed, heat-softened glass sheet supporting position for more difficult or complex bends or curves for the shaped glass. Such a technique is suitable for simultaneous shaping of two sheets of glass or doublet that will be used as the inner and outer plies of conventional laminated glass such as a windshield. For instance, automotive windshields can be made by placing one or more flat glass sheets on the support surface of the bending iron with appropriate spacing material for doublet sheets as that available in U.S. Pat. No. 6,076,373 (Grodziski); U.S. Pat. No. 4,066,429 (Reese et al.); U.S. Pat. No. 3,880,636 (Tobeman et al.); U.S. Pat. No. 6,006,549 (Safka et al.). These are all incorporated herein by reference.

As the glass sags or bends due to gravity the glass contacts an increasing surface of the shaping rails along the bottom marginal edge of the glass. This increasing contact is as opposed to the fewer contact points for the cold precut single or multiple glass sheets placed on the rigid non-articulating or articulating metal shaping rails of the bending iron. The rails themselves are usually pre-shaped to have a shape to support the unbent sheet while also supplying the mold for the curved or bent sheets. The contact of the glass with the rail in bending can give rise to infrequent slight surface markings along the periphery of the bent glass sheet. In addition to these types of scuff markings, other markings on the glass can occur from indentations occurring from inappropriate time and/or temperature experienced by the heated glass on the irons. Other markings can arise from transfer defects on the irons themselves; such as burrs of glass deposited on the rail from previous glass sheets that were shaped. Such surface markings can be accommodated for in laminated windshield products by concealing and glazing or framing parts for the bent glass.

Additionally, shaped glass can be produced from pressure forming which is usually the process used for making curved automotive side windows and back windows although gravity forming equipment could also be used. In the pressure forming of glass sheets pressurized gas assists in shaping the heat-softened glass sheet(s). The glass sheet first can be pre-shaped; for instance by sagging by gravity bending onto a ring or outline mold in a support frame. The mold with the glass and an upper mold of a molding device are moved relative to each other. This movement is to position the molds either in close proximity to each other or to press the upper mold itself against the heated glass. Hot air issues either selectively or more uniformly from the upper mold to flow towards the glass surface. A useful pressure forming process is shown in U.S. Pat. No. 5,669,952 (Claassen et al.). In this patent the mold includes a rail member having a support surface that generally conforms to the elevation and outline of the final longitudinal and transverse shape desired for the bent glass sheets. The rail member itself may be a bar member that supports the glass sheets slightly inboard of the glass sheets periphery or it may be an "L" or "T" shaped member. In pressure forming similar markings can occur on the shaped glass similar to those that can occur in gravity bending.

Additionally, with gravity and press bending, cooling of the shaped glass sheets usually occurs through natural convection or low level forced air cooling.

It is an object of the present invention to provide an apparatus and method and the resulting thermally treated glass having reduced bottom surface defects in particular reduced surface marks which can result when glass is tempered, annealed, shaped or bent on support apparatus or equipment.

SUMMARY OF THE INVENTION

The invention relates to an apparatus and method useful in the thermal treatment of glass sheets or panels and the resulting treated glass sheets and panels. The apparatus is capable of supporting the glass during thermal treatment such as tempering, annealing, bending, and/or shaping which can include any cooling or quenching to remove heat or any combination of these. In one aspect of the invention the apparatus useful for thermal treatments such as tempering and annealing, including the cooling step, is a ring or outline mold. The ring has a horizontal surface suitable for contacting the glass. The horizontal surface can be configured so that it is not just horizontal but may be somewhat non-planar to have an elevational configuration for certain portions or segments. For heat treatments for bending or shaping the apparatus of the present invention can have a support frame and one or more support members attached to the support frame. The support members like the horizontal surface of the ring can conform in elevation, outline or contour, and shape to provide support to one or more glass sheets or panels during thermal treatment. Also the support members can provide support during cooling.

At least the surface of the ring and the support members with or without a coating for contact with the glass are of one or more metals having a thermal conductivity such that the glass heated for shaping cools at a rate not much slower than the cooling rate of unsupported sections of the glass. For instance suitable metals include those with a thermal conductivity of greater than around 60 BTU/(hour×feet×° F. so that the shaped glass can have the requisite edge stress levels desired. In the units above, "x" indicates multiplication. The shape and dimensions of the ring and the support member provide the necessary rigidity to support the glass. These parameters and this characteristic are balanced with the thermal characteristics of the metal for the ring and the support member so that the ring and the support member do not adversely retard the cooling of the glass surface. The shape and/or dimensions of the ring and the support member for certain metals could result in the ring or support member cooling at a slower rate than the glass. Both the ring and support member have designs, shapes, and/or dimensions that for the particular metal or metals of the ring or support member can result in the ring or support member cooling at the same or faster rate than the glass which it supports.

Suitable aforementioned support frames include the non-articulating and articulating types of bending irons and frames known in the art. The articulating irons can add shaping by any method or features known to those skilled in the art. For such bending irons the support members of the inventions would be the shaping rail. Generally the bending irons function as molds for shaping heat softened sheets, e.g., glass sheets. The bending mold has a central portion and can have one or more articulating pivoting end sections. Force applying facilities, e.g., weight assemblies, pressurized canisters, springs or the like can be mounted on the sides of the mold usually in proximity to the outer side of the associated end section of the bending mold. The supporting member or shaping rail can have a shape to support the glass before and during and usually after sagging and bending operations from heat and any mechanical forces. Generally the cross-sectional shape of the supporting member can be "L-shaped", "T-shaped", rectangular, triangular or any nearly flat shape or the like to provide a supporting surface for the glass at or near the marginal edge of the supported surface, usually the bottom surface, of the glass. The support member can have any suitable attachment to the supporting frame.

The present invention also relates to a method of thermally treating and/or a method of shaping one or more sheets, e.g., glass sheet, using a ring or mold, like an outline mold, embodying features of the invention. Such thermal treatment method can include the cooling or quenching of heated glass. The heating method involves placing the glass panels for heat treatment such as tempering or annealing on a ring as a support member such as a tempering or annealing ring so that the glass is supported at or around at least its marginal surface at enough locations on the frame to adequately hold the glass. When the thermal treatment method involves bending or shaping, the glass sheets, panel or panels with preliminary dimensions are placed on the support members of the molding frame for at least marginal support to adequately hold the glass during one or all of heating, shaping and cooling. Both molding frame and supported glass can be heated to a temperature to facilitate the bending or sagging of the glass panel or panels. As the glass bends or sags, the glass may contact more of the supporting members' or rail's surface adequate for the supporting member to function as a mold for the shape of the bent glass sheet or panel around at least the marginal edge of the glass sheet. After the glass bends or sags to shape the molding frame and glass are removed from the heat for cooling of the shaped glass. In the described methods the ring and support member have the surface that with or without a coating contacts the glass made of one or more of the metals having a thermal conductivity of at least around 16 BTU/(hour×feet×° F.).

Additional aspects of the present invention include the shaped glass, various support configurations, and optional coating for the supports or rings. The shaped glass has fewer mold marks on its surface from contacting the supporting members than glass undergoing heat treatment with traditional supporting structures. The support member or ring or mold can have various shape configurations to hold the glass sheet or sheets, and can have a heat resistant and/or anti-corrosive and/or abrasion resistant coating to improve durability.

BRIEF DESCRIPTION OF THE DRAWINGS

In the following description and drawings, like reference numbers identify like parts throughout.

DESCRIPTION OF THE INVENTION AND PREFERRED EMBODIMENTS

Figure 1:
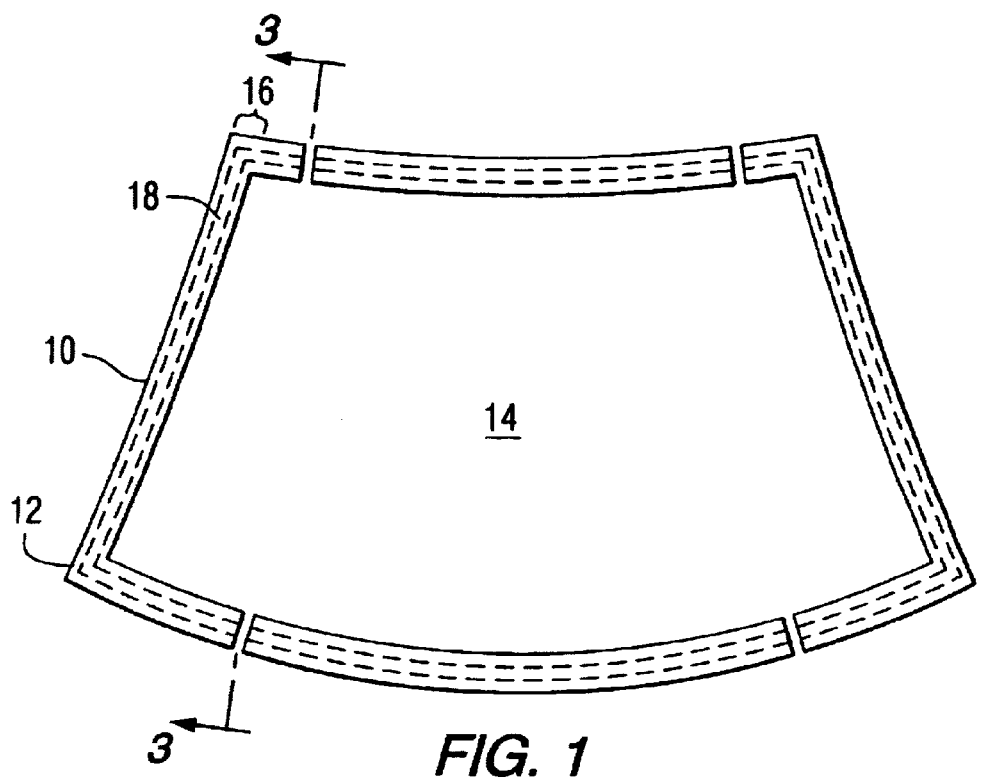
FIG. 1 is a plan view of an annealing ring or outline mold as the supporting member in an uncoated condition in accordance with the present invention.

For purposes of the description hereinafter, the terms "front", "rear", "right", "left", "top", "bottom", "above", "below" and derivatives thereof shall relate to the invention as it is oriented in the drawing figures. However, it is to be understood that the invention may assume various alternatives and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The ring or support member and shaping or bending iron of the present invention such as 10 of FIG. 1 can find utility in heating, shaping and annealing in any suitable lehr for shaping glass sheets. Any shaping and/or annealing process and any lehr known to those skilled in the art can be used. For instance glass on the support member 10 on a bending iron frame can be placed in a conventional stop-and-go type heating lehr or conventional tunnel-type lehr. Also any other thermal treatment or heating and cooling arrangement or annealing arrangement for the glass sheets or panels as are well known to those skilled in the art may be used. Typically a lehr begins with a loading zone and includes a heating zone of tunnel-type configuration, a gravity bending zone, and can include an enclosed press bending or shaping station, a controlled temperature zone, and a cooling station (none of these zones or the lehr are shown in the Figures). All of these are generally aligned in end-to-end relation along the lehr where an unloading zone could exist beyond the cooling zone. The ring, mold, or supporting member such as 10 of FIG. 1 and frame could be carried through the lehr by a ring or mold support carriage, and a plurality of these support carriages of any type well known in the art, can move through the lehr in any convenient manner. For example a plurality of rolls is useful as disclosed in U.S. Pat. No. 4,894,080 to Reese et al. A ring or outline mold and support frame can be mounted on each carriage.

Figure 2:
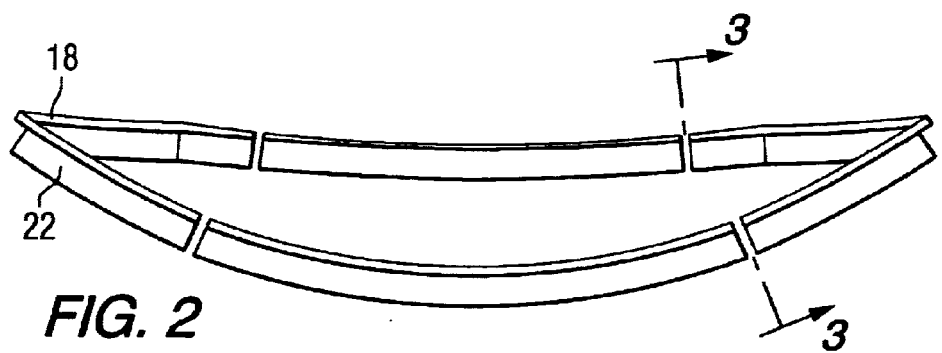
FIG. 2 is a side perspective view of the ring or outline mold of FIG. 1 showing the top and side portions of the ring.
Figure 3:
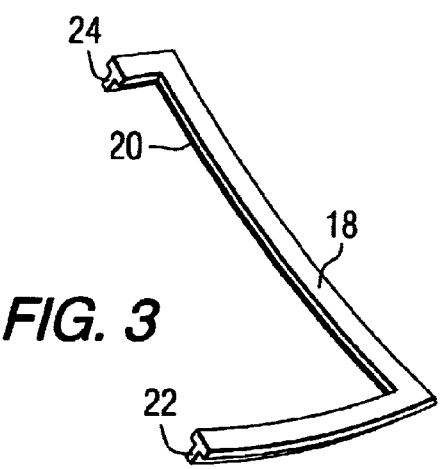
FIG. 3 is a sectional elevational view taken along lines 1—1 in FIG. 2 and rotated to give the elevational view and show the top portion of the ring.

FIGS. 1–3 show various views of an annealing ring or outline mold or shaping rail as a supporting member 10 for the thermal treatment of one or more glass sheets. In FIG. 1 the support member 10 has a general rectangular shape with a wider bottom section 12 for a general shaping rail configuration for a doublet of glass for use in a windshield. The open center 14 usually does not provide any support for the one or more glass sheets supported by member 10 by its width 16. Support member 10 can have any required shape to support one or more sheets or panels of glass, with as many sides as necessary to provide such support for instance polygonal, quadrilateral, circular, and elliptical and the like. The top portion of member 10 is generally flat but can also have curves and/or contours and/or elevational profiles to give a desired shape to the glass. Preferably the length of the top portion 18 is at a minimum sufficient to provide support for the glass sheet or sheets placed on the support 10. Also preferably the width 16 of top portion 18 is not too wide to deleteriously affect the reduction in markings on the glass possible from this type of support. For instance the top portion 18 preferably can have a width of around 1.25 inch (3.18 cm) as can the bottom portion 20. Also the thickness of the top and bottom portions most preferably are around 0.25 inch (0.64 cm.).

FIG. 2 shows the side view of support member 10 having top portion 18 and bottom portion 20 connected to most if not all of top portion 18. Although bottom 20 is shown as continuous as is preferred for the continuous elongated top portion such does not have to be the case. The bottom portion 20 could have gaps, notches, scallops, or undulations along its length under top portion 18.

FIG. 3 shows an end section of the support member 10 where the preferred T-shaped cross-section is shown at ends 22 and 24. This cross-section is formed by top portion 18 over bottom portion 20. This cross section of member 10 as also shown in FIGS. 4–8 can have a shape other than the T-shape. For instance an L-shape or triangle, quadrilateral, rectangle, square or polygonal shape with at least one nearly flat surface for supporting the glass can be used. Also the sides connected to the nearly flat surface can for solid shapes mentioned above have material removed to in essence give something like a "T" shape where removed sections would be about the center portion of the stem of the T-shape. The term "nearly flat" means that the glass supporting surface can be slightly convex or concave as long as this surface can both support the glass and allow for the desired shape upon thermal treatment to produce the shaped glass. This support of the glass is of the marginal bottom surface of the glass sheet on the support member 10. Also for the T-shaped support member 10 the bottom or stem of the T-shape can be perpendicular to the nearly flat top section or angled somewhat to the left or the right of center or normal to the top section. This angle of the stem 20 to top section 18 can allow for attachment of the stem anywhere along the bottom surface (non glass contacting surface) and top section 18. Preferably the stem 20 is perpendicular to the ground on a bending iron frame so that the stem is angled to the top section 18 which is aligned for shape forming capability of glass sheets placed on the top section 18. Also, preferably the stem 20 attaches to top section 18 around the center of the bottom surface of 18.

Figure 4:
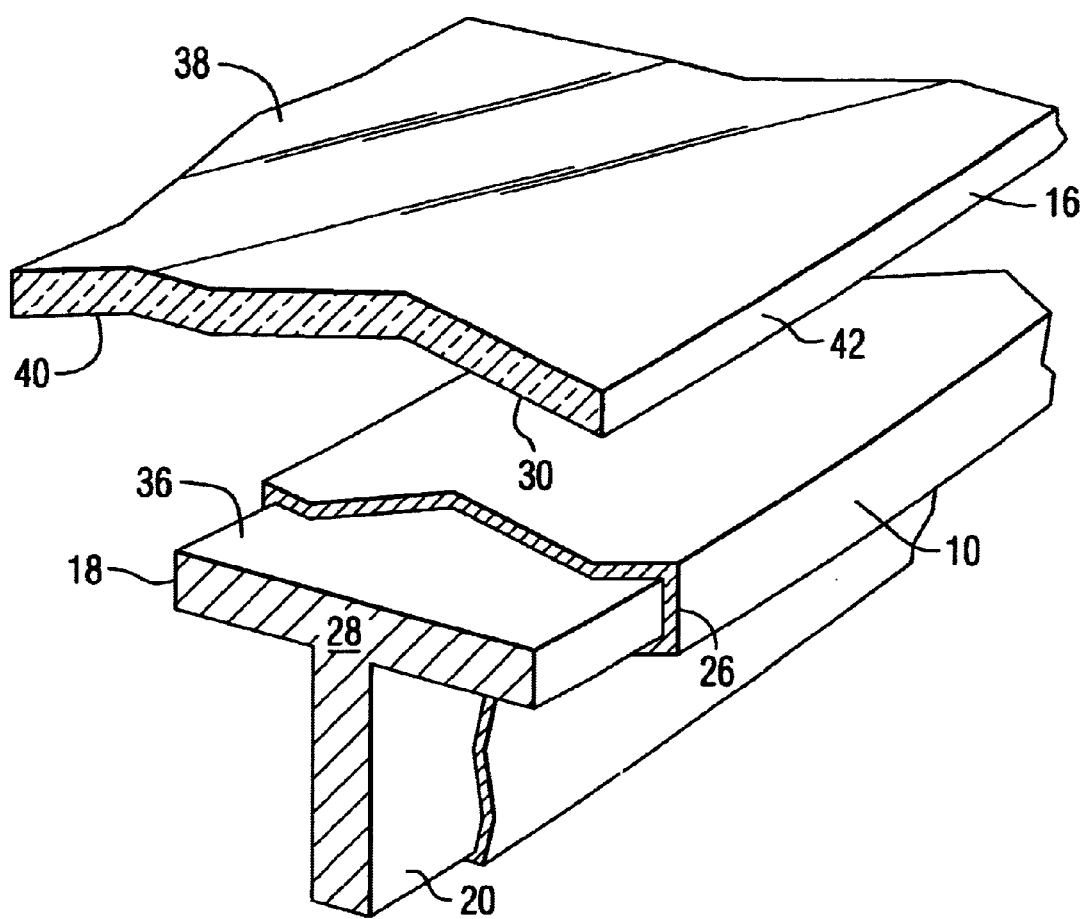
FIG. 4 is a perspective view of a cross section of the supporting member as a ring, mold or shaping rail of the present invention such as the end shown in FIG. 3 at 22 and 24 where the member has a coating and is shown in a relationship to a sheet of glass for support of the glass.
Figure 9:
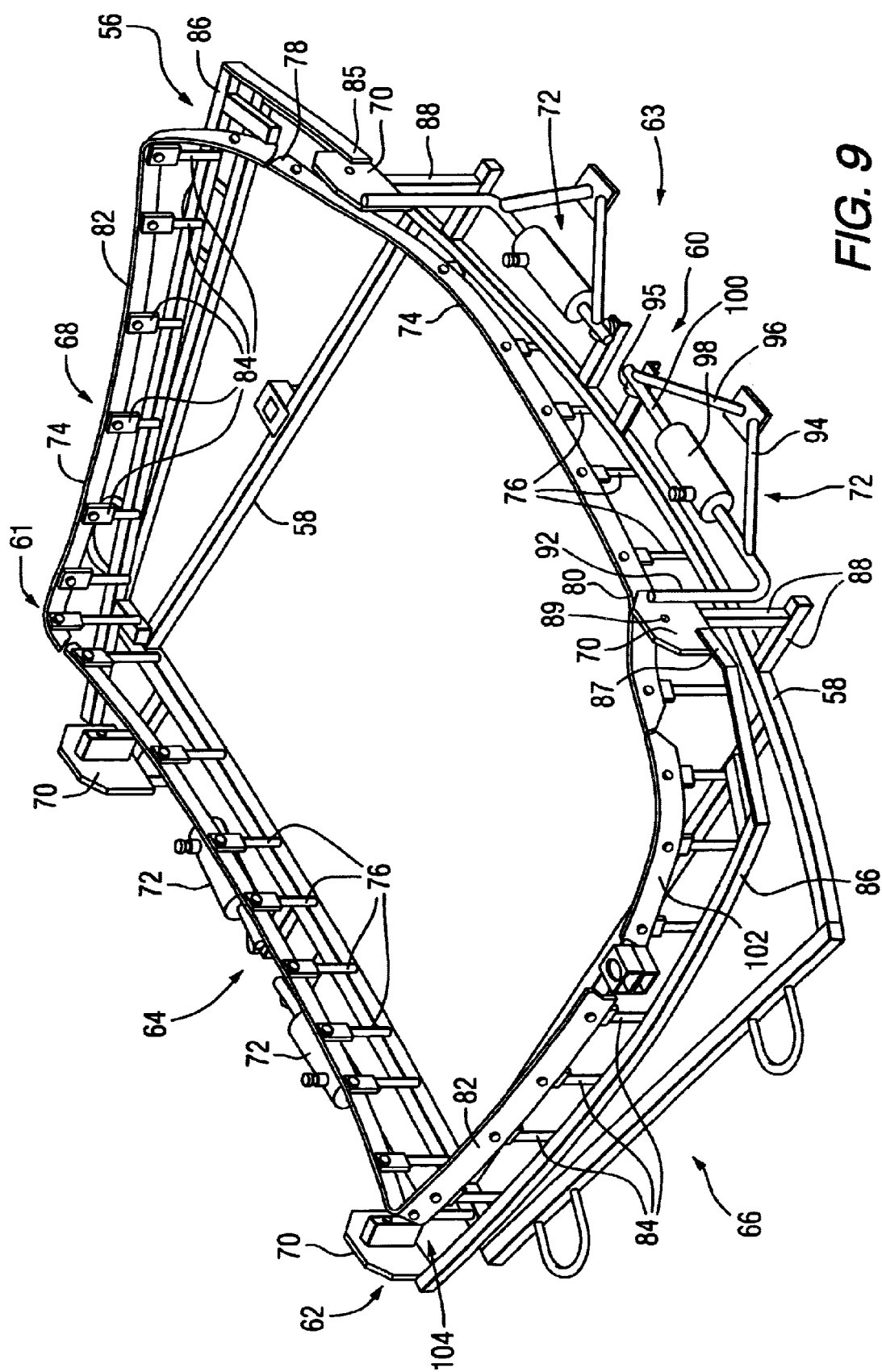
FIG. 9 is a perspective view of a bending mold with the support members of the present invention.

FIG. 4 shows a portion of the support member 10 for a bending iron or frame as that shown in FIG. 9 as a shaping rail for bending glass, preferably doublets. This cross-sectional portion of the rail 10 shows in cutaway the optional but preferred covering or coating 26 which can be a temperature resistant and/or anti-corrosive and/or anti-oxidative and/or abrasion resistant coating or other similar protective coating on the base member 28 of the shaping rail 10. Base member 28 is of the high thermal conductive material as noted above where the thermal conductivity is usually greater than around 60 BTU/(hour×feet×° F.). As indicated in FIG. 4 the shaping rail 10 would contact the marginal area of the bottom surface 30 of glass sheet 32 to provide support for glass sheet 32.

The glass sheet 16 of FIG. 4 can be any commercially produced glass sheet product having two opposing major surfaces 38 and 40 with a peripheral edge surface 42 connecting the two major surfaces for the solid sheet such as float glass. Also, cut sections of large sheets fashioned or preliminarily fashioned for final products are referred to as glass panels herein indicating that some work was performed on the sheet to advance the float glass towards an end product status. In regards to the marginal surface 30 of the glass sheet contacted by the shaping rail 10, this is a marginal surface of the bottom major surface approaching the peripheral edge surface 42 and will hereinafter be referred to as the "marginal edge surface" 30 as opposed to the peripheral edge surface 42. The shaping rail 10 can contact the marginal edge surface 30 of the glass at the corner edge formed from the bottom surface 40 and the peripheral edge surface 42 or up to around 5 mm inboard from such corner edge depending on the particular type of shaping performed on the glass sheet 16. For more complex, more pronounced shaping the distance inboard from the marginal edge may be greater.

Figure 5:
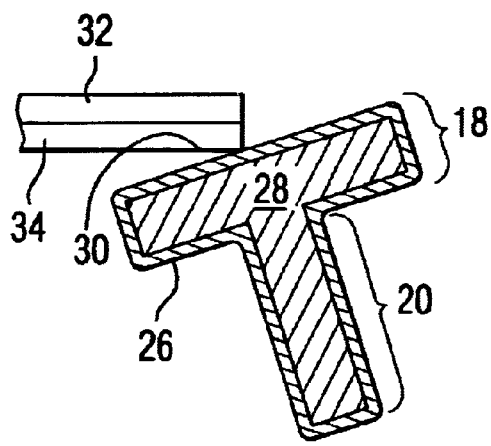
FIG. 5 is a view of the cross section of the T-shaped supporting member as in FIG. 4 supporting a part of the marginal edge of two sheets of glass.
Figure 6:
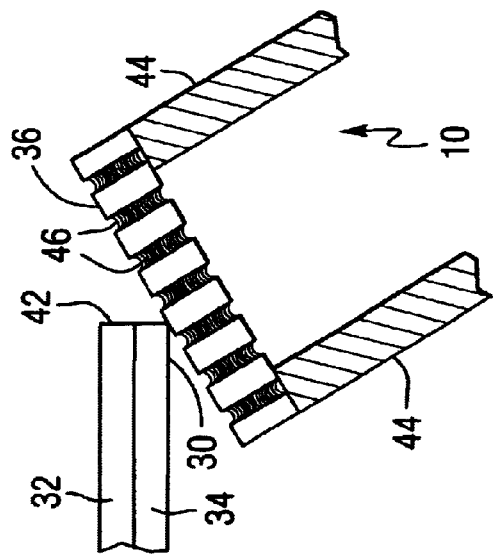
FIG. 6 is a view of the cross section of the reversed U-shaped supporting member supporting a part of the marginal edge of two sheets of glass.

FIG. 5 shows a cross sectional view of the support member 10 as a shaping rail and two glass sheets 32 and 34, a doublet, showing the canted placement of the shaping rail 10 in support of the marginal edge of the glass sheet 32. The shaping rail 10 is an elongated member which can be continuous to form a pattern like a ring with an open center. Although when the support member 10 is a rail on a frame the rail can have a plurality of sections where breaks in the elongation at cross sections allow the rail to have at least one and preferably two opposing pivoting ends. Also like support member 10, such a rail can have any of the aforementioned cross-sectional shapes. The rail 10 supports the glass sheet 32 at or about the marginal section 30 anywhere along the supporting surface 36 of top portion 18 of the shaping rail 10. Preferably the support is around the middle of surface 36 or toward the upper end of surface 36 as depicted in FIG. 5. It is also possible that surface 36 may not be a solid but can be a screen or perforated strip of metal supported at two opposing ends by elongated supports similar to bottom 20 as a stem. This is shown in FIG. 6. In FIG. 6 surface 36 of top portion 18 is attached to one or more stem members 44 for attachment to the frame member generally 58 as shown in FIG. 9.

Also, as shown in FIGS. 4 and 5, the base member 28 preferably has a T-shape because of the more fascile forming conditions for this shape. The T-shape of the base material 28 can be made by casting or by bending and forming processes and even extrusion processes currently used to produce shaping rails for bending irons. Also, the T-shape can be made by welding two flat sections to form the T-shape or by machining a block of material into a T-shape. Also, the material can be cast and extruded. For the support member shaping rail 10, the material just needs to have two axes that intersect as in an L-shape or T-shape. Generally the dimensions of the base 28 as the T-shaped or L-shaped cross-section are such that top 18 is capable of supporting the glass before, during and after shaping. Also the bottom 20 has sufficient dimensions to assist the top is providing support or for attachment to any frame device for gravity or pressure forming. For these dimensions the ends of the base 28 can be square or arcuate or any other arrangement known in the art. Most preferably the thickness of the T-shape for the bottom and top sections 20 and 18, respectively, can be of around 0.090 to around 0.110 inch (0.22 to 0.28 cm) for a pure de-oxidized copper alloy with a nickel chromium protective coating.

With the T-shape or turned L-shape, the surface 36 of top portion 18 during glass shaping allows for an elongated marginal surface of the glass around the corner of the bottom major surface and the peripheral edge surface of the glass to move during shaping or bending.

Figure 8:
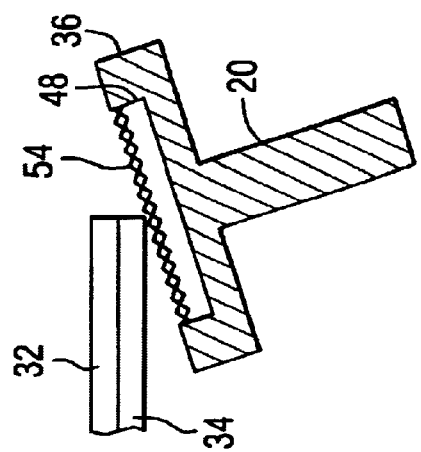
FIG. 8 is a view of the cross section of the T-shaped supporting member supporting a part of the marginal edge of two sheets of glass, where the top member of the T-shape has a notch with low thermal mass material.
Figure 7:
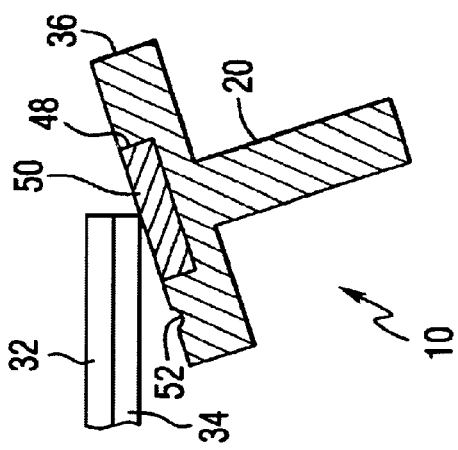
FIG. 7 is a view of the cross section of the T-shaped supporting member supporting a part of the marginal edge of two sheets of glass, where the top member of the T shape has a notch with the high thermal conductive material.

In FIG. 6 shows the cross-section of support member 10 with the screen of perforated material comprising top 18. The perforations can also be in the bottom or stem 20 of the T shaped or L shaped support. Other alternative cross-sectional shapes are shown in FIGS. 7 and 8 with similar various components as in FIGS. 4 and 5. In FIG. 6 the top member 18 has perforations 46 where top member 18 is shown supported by two bottom members 44. Although it is possible for a perforated top member as in FIG. 6 to have stem 20 similar to FIG. 7. In FIG. 7 the top member 18 has an elongated notch 48 where the high thermal conductivity material is placed as an insert 50. Also, the support member could have the top portion 18 made of the higher thermal conductivity material and the bottom or stem 20 made of other material. The connection of 18 and 20 would allow for the different properties of the materials. In this manner sections of the support member 10 can be made of any traditional material for annealing rings or shaping rails such as steel various grades of stainless steels such as AISE 304, AISE 316, or AISE 410 stainless steel, other austenitic, ferritic, martensitic, or precipitation hardened stainless steels, plain carbon steel such as AISE 1018, and alloy steels such as AISE 4140. The high thermal conductivity material is in the elongated notch that can run the distance of the top member 18 along its longitudinal axis. This way the insert runs the longitudinal axis of the support member 10 for glass contact. As shown in FIG. 8, the notch 48 can have an insert which is a screen 54 as opposed to a solid or perforated material of insert 50 in FIG. 7.

The base 28 of the support member 10 can be comprised of material that has a high thermal conductivity of greater than around 16 and preferably greater than around 60 BTU/(hr.×ft×° F.). Suitable non-exclusive examples include copper which has a Coefficient of Thermal Conductivity (W/Mk) of 401 and copper alloys like ones having a nominal chemical composition of:

1.9% Be 0.2% Co (max) with the Balance Copper.

The physical properties of such a material are: Density 0.298 lbs/in$^3$; Specific Gravity 8.26; Melting Point 1800° F.; modulus of Elasticity 18.5×10$^{-6}$ psi ; Thermal Conductivity 62 BTU-in/ft$^2$/hour/° F. (as rolled); 75 BTU-in/ft$^2$/hour/° F. (precipitation hard); Electrical Conductivity 16% ICAS @ 68° F. (as rolled); 22% ICAS @ 68° F.; coefficient of thermal expansion (precip. Hard): 9.9 in/in/° F.×10$^{-6}$ 68°–572° F. The mechanical properties of such materials are:

TABLE I

| Temper | Age Hardening Treatment | Tensile Strength Ksi | Yield Strength 0.2% Offset Ksi | Elongation (in 2 in) % | Rockwell Hardness B or C, Superficial Scale |
| --- | --- | --- | --- | --- | --- |
| As Rolled ¼H | — | 75–88 | 60–80 | 15–40 | B 68–90 30T 62–72 |
| As Rolled ½H | — | 85–100 | 75–95 | 5–25 | B 88–96 30T 75–80 |
| After Age Hardening ¼H | 2 hr at 600° F. | 175–200 | 150–180 | 2.5–6 | C 38–42 30N 58–62 |
| After Age Hardening ¼H | 2 hr at 600° F. | 185–210 | 160–190 | 1–5 | C 39–44 30N 60–64 |

Other non-exclusive examples of suitable copper materials and alloys for the present invention include: an oxygen-free copper, which is particularly suitable for the pure copper, and an Al$_2$O$_3$-dispersion strengthened copper, a CuCrZr alloy, a CuNiBe alloy, a CuCrZrSi alloy, a CuW alloy, and the like. Further examples of these include:

0.3%Cr-0.1%Zr—Cu; 0.35%Cr-0.1%Zr-0.03%Si—Cu alloy; and 70%W-Cu alloy. Other suitable alloys include: aluminum-copper alloys and aluminum-silicon-copper alloys; a copper-molybdenum alloys; a copper-tungsten antimony, and/or nickel and mixtures and blends to these. Further additional non-exclusive examples of suitable high thermal conductive material are those listed in Table II below:

TABLE II

| Alloy name | Nominal composition, (%) | Thermal Conductivity |
|---|---|---|
| | | BTU ft/(hr ft$^2$ ° F.)/(cal × cm/(sec × cm$^2$ × ° C. |
| (oxygen-free copper) | 99.95 Cu | 226 (0.934) |
| (electrolytic tough pitch copper) | 99.90 Co 0.040 | 226 (0.934) |
| (phosphorus-deoxidized copper, high residual phosphorus) | 99.90 Cu 0.02 P | 196 (0.81) |
| (phosphorus-deoxidized tellurium-bearing copper | 99.5 Cu, 0.50, Te 0008 P. | 205 (0.85) |
| (sulfur-bearing copper) | 99.6 Cu, 0.40 S | 216 (0.89) |
| (zirconium copper) | 99.8 Cu, 0.15 Zr | 212 (0.876) |
| (beryllium copper) | 995 Cu, 1.7 Be, 020 Co | 62–75 (0.26–0.31) |
| (beryllium copper) | 99.5 Cu, 1.9 Be, 0 20 Co | 62–75 (0 26–0 31) |
| (chromium copper) | 99.0 Cu 1.0 Cr | 187 |
| (leaded copper) | 99.0 Cu 1.0 Pb | 218 (0.24–73) |
| Copper-iron-zinc-phosphorus | 97.5 Cu 2.4 Fe. 0.13 Zn, 0.03 P | 150 (0 625) |
| (gilding, 95%) | 95.0 Cu 5.0 Zn | 109 (0 45) |
| (commercial bronze, 90%) | 90.0 Cu 10.0 Zn | 92 (0.38) |
| (redbrass 85%) | 85.0 Cu 15.0 Zn | 81 (0.33) |
| (low brass, 80%) | 80.0 Cu 20.0 Zn | 70 (0 29) |
| (carriage brass 70%); | 70.0 Cu 30.0 Zn | 67 (028) |
| Yellow brass | 650 Cu 35.0 Zn | 67 (0 28) |
| (Muntz metal) | 600 Cu 40.0 Zn | 71 (0.29) |
| (leaded commercial bronze) | 89.0 Cu, 1.8 Pb, 9.2 Zn | 104 (0.43) |
| (low-leaded brass) | 65.0 0.5 Pb, 34.5 Zn | 67 (0 28) |
| (medium-leaded brass) | 65.0 Cu, 1.0 Pb, 34.0 Zn | 67 (0.28) |
| high leaded brass) | 64 5 Cu, 2.0 Pb, 33.5 Zn | 67 (028) |
| (medium-leaded brass) | 62 5 Cu, 1.1 Pb, 36 4 Zn | 67 (025) |
| High leaded brass) | 62 5 Cu, 1.8 Pb, 36.2 Zn | 67 (0 28) |
| (extra-high leaded brass) | 63.0 Cu, 2.5 Pb, 34.5 Zn | 67 (028) |
| (free cutting brass) | 61 5 Cu, 3 0 Pb, 35 5 Zn) | 67 (0.28) |
| (leaded Muntz metal | 60 0 Cu, 0.6 Pb, 39.4 Zn- | 71 (0 29) |
| (free cutting Muntz metal) | 60 0 Cu, 1.0 Pb, 39.0 Zn- | 69 (0.28) |
| (forging brass)· | 59.0 Cu, 2.0 PPb, 39.0 Zn | 69 (0.28) |
| Architectural bronze | 57.0 Cu, 3.0 Pb., 40.0 Zn | 71 (0.29) |
| | 95.0 Cu 1.0 Sn, 4.0 Zn | 95 (0.43) |
| | 90.0 Cu., 1.0 Sn, 9.0 Zn | 77 (0.32) |
| inhibited admiralty- | 71.0 Cu 28.0 Zn, 1.0 Sn | 64 (026) |
| naval brass | 60 Cu, 0.7 Pb, 0 8 Sn, 38 0 Zn | 67 (0.28) |
| naval brass-medium leaded | 60 5 Cu, 0.7 Pb, 0.8 Sn, 38 0 Zn | 67 (0.28) |
| Leaded naval brass | 60 0 Cu, 1.8 Pb, 37.5 Zn., 0.7 Sn | 67 (0.28) |
| Manganese bronze | 58.5 Cu, 1.4 Fe, 39.0 Zn., 1.0 Sn., 0.1 Mn. | 61 (0.26) | alloys; a copper-molybdenum alloys. The alloy can have a composition comprising: 15% to 75% of molybdenum, 3% to 20% of copper (Cu), 2% to 10% of aluminum, 3% to 30% of aluminum nitride, around 0.3% of magnesium (Mg), 0.5% to 5% of cobalt (Co), around 5% of nickel (Ni), 5% to 30% of molybdenum carbide (Mo$_2$C), around 0.3% of silver (Ag), and 0.1% to 5% of carbon. Copper-tungsten alloys can have a composition comprising 15% to 75% of tungsten, 3% to 20% of copper (Cu), 2% to 10% of aluminum, 3% to 30% of aluminum nitride, around 0.3% of magnesium (Mg), 0.5% to 5% of cobalt (Co), around 0.5% of nickel (Ni), 5% to 40% of tungsten carbide, around 0.3% of silver (Ag), and 0.1% to 5% of carbon. Generally the range of addition of tungsten can be around 15% to 75% on a weight basis. The preferred material for base 28 is a copper alloy having from about 60 preferably 75 to about 99.5% by weight copper where other materials that may be present with the copper include oxygen, phosphorus, sulfur, zirconium, beryllium, cobalt, lead, tin, zinc, aluminum, iron, silicon, manganese, Other useful high thermally conductive materials include noble metals and their alloys such as platinum, palladium, and gold; and silver and their alloys. These materials also allow for support members 10 to assist in effective heat dissipation (extraction) from the supported glass without the need for additional heat sinks. Non-exclusive examples of these include: silver, silver and palladium, silver-palladium alloys, or admixtures; gold, silver, copper, palladium, platinum, gold/copper alloys and palladium/gold alloys; tungsten, molybdenum, tantalum, or alloys thereof and gold-copper eutectic alloy, and any known mixtures and alloys of any of all of these.

The optional but preferred coating 26 for shaping rail 10 as shown in FIGS. 4 and 5 can extend over the entire exposed surface of the base member 28. At a minimum the coating 26 is on the surface 36 of top portion 18 for contacting the glass. Also the coating can comprise one or more layers of the same or different coating material depending on the functionality to be added to the support member 10. With the higher thermal conductivity base material 28, degradation may occur at the higher temperatures increasing the need for one or more protective coating layers. The optional coating 26 can assist in resisting oxidation of the base material 28. The coating 26 in one or more layers can be placed on the base material 28 by high energy spray means such as plasma spraying, flame spray, high velocity oxy-fuel, detonation gun, and others such as electrostatic spraying, dipping, electro-plating, anodic plating, spraying and the like methods known to those skilled in the art. For instance a Roto-Tec flame spray gun can be utilized.

The coating 26 which is applied can be a hard metal that can exhibit less glass wetting than the base metal of the support member 10. The hardness of the support metal layer is not critical and, in general, it may be stated that the harder the metal the greater will be the realized increase in life of the support member 10. For instance the metal can have a melting point greater than about 1700° F. (927° C.) Suitable metals are the transition metals i.e., those elements appearing in Groups IIIB, IVB, VB, VIB, VIIB, VIIIB, IB and IIB of the periodic chart; i.e., mixtures thereof and alloys thereof in which the alloy can be at least about 50% by weight, and more suitable at least about 60% by weight, of at least one of said transition metals. Useful materials to give coating 26 upon application include stainless steel, non-corrodible ceramics, cobalt, molybdenum, Cermet, tungsten, titanium oxide, zirconium oxide, and similar ceramics, and the like. Particularly suitable metals are nickel and chromium. A more particularly desirable material is an alloy of about 60 to about 95% nickel and about 0.5 to 18% chromium; the balance can be ingredients, or adjuvants, present as processing aids, for example fluxing agents, to enhance the known use of these materials in spray applications such as plasma or flame spraying. These materials are well known and widely commercially available. Such commercially available materials include: nickel chromium wires or powders available from Praxair Surface Technologies, Inc. of Indianapolis, Ind. such as the product PLASMALLOY™ powders.

Additionally, particularly when the application method is high energy spray, i.e., plasma spray or flame spraying, the metals which are applied can include transition metal carbides and/or transition metal nitrides in small quantities which can enhance the hardness. Typically the amounts of these carbides and/or nitrides when present can be on the order of about 2% to about 18% by weight. A non-exclusive example of such materials for the coating layer 26 includes about 60 to about 95% (wt.) nickel, about 0.5 to about 18% chromium, and optionally about 2–18% of at least one transition metal carbide or nitride and the balance being conventional processing aids. Commercial examples of some of these materials include: nickel chromium flame sprayable materials available from Eutectic Castolin Ltd. of St Sulpice, Switzerland such as Diamax products like the material of about 61% Ni and 7% Cr and about 12% by weight of tungsten carbide; with a balance of aluminum and boron and also small amounts of calcium, magnesium, manganese iron, lead, silicon and titanium but the precise chemical species can be either elemental or combined as for example as an oxide.

When the coating 26 is or includes an abrasion resistant coating layer or layers useful materials include: aluminum oxide, chromium oxide, titanium oxide, mixed oxides of aluminum oxide and titanium, chromium carbide cermets, tungsten carbide cermets or oxides, tungsten carbide-cobalt cermets, tungsten carbide-nickel cermets, tungsten carbide-chromium-cobalt cermets, tungsten carbide-chromium-nickel cermets, chromium carbide-nickel-chromium cermets, chromium carbide-IN-625 cermets, and tungsten-titanium carbide-nickel cermets. Also these coating layers could be deposited on the coatings used in this invention as a top coat to provide wear resistance for the coated support member 10.

In applying the coating 26 to the base 28 by the aforementioned application methods the surface of the base can be pre-treated to enhance the bonding of the coating 26 to the base 28. Conventional techniques may be employed in this regard. For instance, the surface of the base 28 can have a rough or textured surface profile. Such a rough surface can be employed as is, i.e., no direct attempts need be made to provide a smoother surface profile to the support metal. Such an example is that which might be accomplished by application of additional heat to get better flow or such as, for example, by machining the surface. Also the base 28 even when used without a coating can be cold worked with a highly aggressive grit blasting procedure to overcome any soft type of alloy to increase the material's strength.

Additionally or alternatively to maximize the affinity of the coating to the surface of base 28, the surface optionally can be cleaned prior to deposition of the coating. For instance the surface can be baked to burn off any undesirable organic residuals, and also subsequently grit blasted. For example the base 28 can first pass through a conventional glass annealing lehr whereby it is heated to effect a baking off of any residual organics on the surface. The glass contacting surface of this supporting member 10 or shaping rail can then conventionally be grit blasted. It is also possible to employ a primer, or bonding underlayer. For example the coating layer 26 can be an alloy of 61 parts nickel and about 7 parts chromium and include tungsten carbide which functions to increase the hardness of the support layer. The amount of tungsten carbide generally can be on the order of about 12 parts by weight. The nickel-chromium alloy can also be applied initially as the primer coat and a nickel-chromium alloy containing the tungsten carbide can be applied as the protective coating 26. Also the base 28 can be pre-heated immediately prior to the flame spraying of the coating layer. For instance, the base 28 can be heated to a temperature in the range of about 200° to about 500° F. (93 to 260° C.) which is generally the temperature range during flame spraying.

When using flame spray techniques it is generally desirable to apply the coating 26 by means of commercially available oxyacetylene torches designed to flame spray fine particulate materials. Other flames such as, for example, oxyhydrogen flames, can equally be employed. The techniques utilized for plasma spray application are based on ionized gas plasma and equipment for plasma spraying particulate materials may be procured from numerous suppliers. The particle size transition of the metal-containing material employed for forming the coating layer can be generally in the size range of about 500 microns to about 1000 microns.

In applying the coating 26 to base 28 in this invention, the thermal spraying process can be used. For instance, the powders for the coating 26 can be applied onto the surface of base 28 at a gas temperature from about 3000° F. to 5800° F. (1649–3204° C.) at a gas pressure of from about 11 arm to 18 arm, and to a coating thickness of around 0.0035 inch (0.009 cm.) or greater. Also, the arc spray and sputter coating methods like magnetic sputter vacuum deposition can be used.

When flame spray or plasma spray is used to apply the coating 26, the particles coalesce and form an adherent coating layer on the surface of the base 28. The flame spraying of the material to form the layer of coating 26 can be done to produce a textured or rough coating having a depth of about 0.012 inch (0.03 cm). Generally the thickness of the coating can be greater than 0.0035 inch, (0.009 cm.) for the purpose of providing an anti-corrosive coating.

The support member 10 is shown as a shaping rail 74 in a bending mold in an embodiment of the invention generally designated 56 in FIG. 9 of the drawings. Generally the bending iron or mold 56 can be any articulating or non-articulating bending mold although the articulating mold is preferred. Generally the articulating bending mold 56 has a main frame 58 with a central portion 60 with two opposing pivoting end sections 61 and 62. For purposes of discussion and not to be considered as limiting to the invention, the bending mold 56 has a front 63, a rear 64, a left side 66 and a right side 68. Each end section 61 and 62 is pivotally mounted for instance on a pair of hinge blocks 70, collectively, extending outwardly from the front and rear of the main frame 58. A force applying facility 72, such as one or more and preferably a pair of weight arms, is connected to each end section inboard of the hinge blocks 70 and extend along opposing sides of the central portion 60 of the mold 56. The force applying facility 72 is configured to bias the end sections 61 and 62 upwardly under the influence of gravity when the glass sheet reaches its softening temperature to shape the glass sheet. The at least one shaping rail 74 preferably in around 4 segments is supportedly connected to the mold through a plurality of supports 76, collectively. The rail 74 preferably is arranged in segments so that each non-end lateral side of the central portion 60 and both pivoting ends sections 61 and 62 have a portion or segment of the shaping rail 74.

Although not limiting to the invention, in the following discussion the front 63 may be considered the leading edge and the rear 64 may be considered the trailing edge of the mold 56 as it moves through a lehr (not shown) for heating. Each shaping rail 74 for the central portion 60 has a first end 78 and a second end 80. The central shaping rails 74 have a contour to provide the central portion of the sheet to be shaped with a desired contour.

At least one end shaping rail 82 is located on each mold end section 61 and 62 pivotally mounted on the mold 56 in a manner for movement toward and away from the main frame 58. The central shaping rails 74 are mounted on the main frame 58 in any usual or conventional manner, such as by support members 76 attached to main frame 58, as shown in FIG. 9. The end shaping rails 82 may be mounted by support members 84 attached to a strengthening or reinforcing bar 86. The rails 74 and 82 are shaped to provide the desired contour of the shaped sheet. More particularly, when the sheet to be shaped, e.g., a flat glass sheet, is to be placed on the mold 56, the end sections 61 and 62 are pivoted downwardly so that the more extreme portions of the ends are moving away from the central portion 60 to open the mold 56, i.e., to pivot the end sections 61 and 62 toward the main frame 58. When the flat glass is in position on the mold 56, the weight of the glass sheet holds the mold 56 in this open position. As the glass sheet heats and softens in the lehr, the end sections 61 and 62 move upwardly away from the main frame 58 to shape the glass sheet to the desired contour.

Both end sections 61 and 62 are structurally similar, therefore only end section 62 will be described in detail, with the understanding that the discussion also relates to end section 61 unless otherwise indicated. As shown in FIG. 9, the end section 62 has a generally "C"-shape, when viewed from a plan view above the frame 58. Reinforcing bar 86 can have a similar C-shape with similar opposing ends as the end rail 82 except the ends 85 and 87 are attached for pivoting movement to their appropriate hinge plates 70. Also the other ends of both reinforcing bars 86 are similarly attached to the hinge plates on the opposing side of the bending mold 56. Of course the invention is not limited to end sections of such shape for the reinforcing bar 86. The end sections 61 and 62 and associated shaping rails and/or reinforcing bars could be of any required shape, such as rectangular, semi-circular, elliptical, and the like. The reinforcing bar 86 are movably, e.g., pivotally, mounted adjacent the first ends 78 of the central shaping rails 74 by hinge members 70. The end section 61 is similarly movably mounted adjacent the opposing ends of the central shaping rails 74. The hinge members 70 define the mounting or pivot points for the end sections 61 and 62 by any pivoting or rotating device known in the art.

For example, as shown in FIG. 9, the hinge members 70 may be embodied as metal plate member attached for pivoting movement about rotation point 89 to frame member 58 by extension pieces 88. The rotation point can be rollers, rail or ball bearings to facilitate angular movement. One end of the reinforcing bar 86 is connected for pivoting movement to the hinge 70 while the opposing end of the same reinforcing bar is connected for pivoting movement to the opposing hinge 70 on the opposing side of frame 58. In this manner the end shaping rail 82 can pivot up in response to the action of the force applying facility 72 with respect to the central portion 60. Additionally the force applying facility 72 is connected for pivoting action to hinge plate 70. Referring back to FIG. 9, a force applying device 72 or a biasing device is mounted on each side 63 and 64 of the bending mold 56. These force applying devices may be of any conventional type, such as a weight and pulley device, spring device, or adjustable weight device, or linear actuators like electric motors or ball screws and the like. The force applying devices may be configured as slideable weight assemblies 90. Since as is preferred each weight assembly 90 in a pair for each end 61 and 62 are structurally similar, only the weight assembly 90 on the front side 63 of the bending mold 56 shown in FIG. 9 will be described in detail. This is with the understanding that the discussion is also applicable to the other weight assembly 90 on the opposing side 64 for the pair for that end and to the assemblies 90 in the pair at the opposing end of the mold 56. The weight assembly 90 is mounted preferably for pivoting movement directly to hinge plate 70 with extension piece 92. Preferably the opposing end of the weight assembly has an extension to bar 100 to this type of lever arm which can rest on stop 95. With the weight 98 arranged closer to the hinge plate 70 more pivoting force can be applied to the hinge plate 70. Of course the stop 95 can also be an attachment which can allow for movement of bar 100 in response to the pivot of the hinge plate. Also bars 94 and 96 can be located in spaced apart relationship at each end of weight 98 to terminate the movement of weight 98 for slideable settings along bar 100 for different force applications for different glass bending requirements. Other non-exclusive examples of suitable weight assemblies and connection assemblies and the discussion of the operation of the mold with pivoting end sections are those disclosed in U.S. Pat. Nos 6,006,549; 6,076,373; 4,066,429 and 3,880,636 all herein incorporated by reference. Also, it is possible for the bending iron 56 to have one or more target locations for vision system assistance in positioning or locating the iron mechanically or electronically in use.

In shaping glass sheets, it is not uncommon for one end of the glass sheet to be wider than the other end of the glass sheet, e.g., for automotive windshields the portion of the glass sheet forming the top of the windshield will be narrower than the portion forming the bottom of the windshield as mounted in an automobile. Thus, one corner 102 of the end section 62, e.g., may be spaced farther from its associated hinge point 70 than the other, front corner 104. While the corners 102 and 104 are shown in FIG. 9 as being substantially angular, corners 102 and 104, and associated shaping rail 82 and/or reinforcing bar 86, could be contoured or curved. The term "corner" is used broadly herein to describe an area or portion of the end section in which the shape of the end section or shaping rail changes from extending substantially parallel to the front or rear edges of the mold to be substantially perpendicular to the front or rear edges.

EXAMPLE

A bending iron similar to that shown in FIG. 9 was tested with a rail having a T-shape and a base of copper 11000 alloy with a size of 1.25 by 0.25 inch (3.18 by 0.64 cm.) for both the top and bottom sections of the "T". The rail was machined and rolled to shape. The rail had a high emissivity nickel chromium coating with a thickness in the range of 0.09 to 0.11 inch (0.22 to 0.28 cm.). The bottom of the "T" was plasma coated and the top of the "T" was electroplated. Glass doublets were gravity bent and press bent at reduced pressure than normal pressure bending. The doublets did not have detectable mold marks along any of the sides including the elimination of any mold marks at the top of the glass sheet. This compared to doublets prepared by press bending with a standard bending iron rail which had mold marks on all sides of the windshield.

We claim:

1. A glass shaping apparatus, comprising:
a support frame;
an outline shaping rail supported on said frame, the shaping rail having a sheet shaping surface that conforms in elevation and outline to a final desired shape of a marginal edge of a glass sheet to be shaped and having an open area within the outline shaping rail wherein the open area within the shaping rail is void of a sheet-supporting member, the shaping rail providing support around a substantial portion of the perimeter of the glass sheet to be shaped wherein the sheet shaping surface is comprised of material selected from the group of:
i) metals having a thermal conductivity of greater than 16 BTU/(hr. ft. ° F.), or ii) low thermal mass materials with a melting point higher than 1100° F., where low thermal mass means the thermal mass, weight or volume of the material of the rail multiplied by that materials specific heat or thermal capacity or heat capacity so as not to act as a heat sink for the heated glass sheet to be shaped.

2. The apparatus as in claim 1 wherein the sheet shaping surface of said shaping rail is a material selected from metals having a thermal conductivity of greater than 150 BTU/hr. ft. ° F.

3. The apparatus as in claim 1 wherein said shaping rail is an articulating shaping rail and a portion of said shaping rail is a pivoting portion.

4. The apparatus as in claim 1 wherein the shaping surface of the shaping rail has material selected from the group of: copper or a copper alloy; tungsten; molybdenum; tantalum; or alloys of any of these; noble metals and their alloys; or admixtures of any of these.

5. The apparatus as in claim 4 wherein said copper alloys have at least 75 weight percent copper.

6. The apparatus as in claim 1 wherein said sheet shaping surface of the rail has a glass facing member with at least two opposing spaced apart longitudinal sections and two opposing spaced apart arcuate sections each at an opposite end and each matched to two ends of the longitudinal sections and with an elongated transverse portion comprising the width of the rail with a flat, convex, or concave surface facing the glass sheet.

7. The apparatus as in claim 6 wherein elongated transverse portion of said rail at both the longitudinal sections and the arcuate sections has a support member extending away from the elongated transverse portion facing the glass sheet.

8. The apparatus as in claim 7 wherein said rail has a cross-sectional shape through the transverse portion and support member selected from rectangular, triangular, L-shaped, T-shaped.

9. The apparatus as in claim 1 wherein said material of low thermal mass materials are selected from metal screens, perforated metal sheets, and the cross-sectional shape is hammock-shaped.

10. The apparatus as in claim 1 which includes at least one auxiliary rail positioned along a section of said shaping rail, wherein said shaping rail section has a sheet shaping surface portion generally corresponding to said final desired shape of a selected marginal edge portion of said sheet and said auxiliary rail has a sheet shaping surface generally corresponding to a preliminary shape of said selected marginal edge portion of said sheet, said auxiliary rail being mounted for movement relative to said shaping rail section from a first position, wherein portions of said sheet shaping surface of said auxiliary rail are above said sheet shaping surface portion of said shaping rail section and is capable of supporting said selected marginal edge portion of said sheet above said shaping rail section and preliminarily shaping said selected marginal edge portion, and a second position wherein said sheet shaping surface of said auxiliary rail is positioned below said portion of said sheet shaping surface of said shaping rail section such that said portion of said sheet shaping surface of said shaping rail section is capable of supporting and shaping said selected marginal edge portion of said sheet to said final desired shape and wherein the auxiliary rail is comprised of material selected from the group of metals having a thermal conductivity of greater than 90 BTU/hr. ft. ° F. or low thermal mass materials with a melting point higher than 1100° C., where low thermal mass means the thermal mass, weight or volume of the material of the rail multiplied by that materials specific heat or thermal capacity or heat capacity so as not to act as a heat sink for the heated glass sheet to be shaped.

11. The apparatus as in claim 10 wherein said auxiliary rail has a horizontal curvature that generally corresponds to a horizontal curvature of said shaping rail portion.

12. The apparatus as in claim 1 wherein said rail has a protective coating to retard high temperature degradation or a wear resistant protective coating.

13. The apparatus as in claim 12 wherein the coating is selected from plasma sprayed nickel chromium alloy coatings, ceramic coatings, arc spraying coatings and sputter coatings.

14. The apparatus as in claim 1 wherein the rail has a vertical member and a horizontal member joined together to provide the rail with a "T" shape cross-section wherein the horizontal member includes the sheet shaping surface, and further comprising at least one perforation in at least the horizontal member of the "T" shaped rail.

15. The apparatus as in claim 1 wherein outboard side of the sheet shaping surface of the shaping rail contacts glass supported thereon in near or close proximity to marginal edge of the glass contacting the shaping surface of the shaping rail.

16. The apparatus as in claim 1 wherein the shaping rail has a predetermined thermal conductivity defined as a first thermal conductivity and the shaping surface of the shaping rail has one or more notches and further including an insert having a predetermined thermal conductivity defined as a second thermal conductivity, the insert in at least one of the one or more notches of the shaping surface of the shaping rail wherein the second thermal conductivity is higher than the first thermal conductivity.

17. The apparatus as in claim 16 wherein the shaping rail is a stainless steel shaping rail.

18. The apparatus as in claim 16 wherein the insert is graphite.

19. A method of shaping a glass sheet by gravity sag bending, including the steps of;
   providing a shaping rail with a shaping surface of a elongated transverse portion having an elevational contour and outline generally corresponding to a final desired shape of a marginal edge portion of a sheet to be shaped and where such surface is comprised of material selected from the group of:
      i) metals having a thermal conductivity of greater than 16 BTU/(hr. ft. ° F.), or ii) low thermal mass materials with a melting point higher than 1100° C., where low thermal mass means the thermal mass, weight or volume of the material of the rail multiplied by that materials specific heat or thermal capacity or heat capacity so as not to act as a heat sink for the heated glass sheet to be shaped;
   supporting an auxiliary rail having an upper shaping surface generally corresponding to a preliminary shape of a selected marginal edge portion of said sheet, in a first position along an adjacent section of said shaping rail, wherein said upper shaping surface of said auxiliary rail is above at least a portion of said shaping surface of said adjacent shaping rail section;
   placing said sheet on said shaping rail and said auxiliary rail such that said selected marginal edge portion of said sheet is supported by said upper shaping surface of said auxiliary rail and above said portion of said shaping surface of said adjacent shaping rail section;
   heating said sheet to its heat softening temperature such that a first portion of said sheet sags by gravity into contact with portions of said upper shaping surface of said shaping rail and said selected marginal edge portion of said sheet contacts said upper shaping surface of said auxiliary rail, to preliminarily shape said sheet; and
lowering said auxiliary rail to deposit said selected marginal edge portion of said sheet onto said adjacent shaping rail section so as to allow said selected marginal edge portion of said sheet to sag into contact with said portion of said upper shaping surface of said adjacent shaping rail section and allow said sheet to sag to said final desired configuration.

20. The apparatus as in claim 4 wherein the material is selected from the group of: beryllium-copper, $Al_2O_3$-dispersion strengthened copper, a CuCrZr alloy, a CuNiBe alloy, a CuCrZrSi alloy, aluminum-copper alloys, aluminum-silicon-copper alloys, a copper-molybdenum alloy, a copper-tungsten alloy, a copper-molybdenum alloy, gold or its alloys, silver or its alloys, platinum and its alloys, palladium or its alloys, silver and palladium alloy, gold/copper alloys, palladium/gold alloys, gold-copper eutectic alloy, or admixtures of any of these.

* * * * *